US009461896B2

(12) United States Patent
Groves et al.

(10) Patent No.: US 9,461,896 B2
(45) Date of Patent: Oct. 4, 2016

(54) METHODS AND SYSTEMS FOR EFFICIENT UPDATING OF TIME-ALIGNED GRAPHS IN A MONITORING SYSTEM

(71) Applicant: Riverbed Technology, Inc., San Francisco, CA (US)

(72) Inventors: Greg Groves, St. Albert (CA); Eric Rogner, Kensington, MD (US); David Berman, Silver Spring, MD (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 879 days.

(21) Appl. No.: 13/715,381

(22) Filed: Dec. 14, 2012

(65) Prior Publication Data

US 2013/0159512 A1 Jun. 20, 2013

Related U.S. Application Data (60) Provisional application No. 61/576,172, filed on Dec. 15, 2011.

(51) Int. Cl.
*G06F 15/16* (2006.01)
*H04L 12/26* (2006.01)

(52) U.S. Cl.
CPC ......... *H04L 43/045* (2013.01); *H04L 43/0817* (2013.01)

(58) Field of Classification Search
CPC .................................................. H04L 43/045
USPC ......................................................... 709/224
See application file for complete search history.

(56) References Cited

U.S. PATENT DOCUMENTS

| 6,097,399 | A  | * | 8/2000  | Bhatt      | G09G 1/162   |
|           |    |   |         |            | 345/440      |
| 7,027,051 | B2 | * | 4/2006  | Alford, Jr.| G06T 17/00   |
|           |    |   |         |            | 345/440      |
| 7,324,535 | B1 | * | 1/2008  | Goss       | H04L 45/50   |
|           |    |   |         |            | 370/230      |
| 8,250,257 | B1 | * | 8/2012  | Harel      | G06F 13/00   |
|           |    |   |         |            | 710/38       |
| 2003/0110007 | A1 | * | 6/2003 | McGee   | G06F 11/0709 |
|           |    |   |         |            | 702/179      |
| 2009/0044171 | A1 | * | 2/2009 | Avadhanula | G06F 8/20  |
|           |    |   |         |            | 717/105      |
| 2010/0318931 | A1 | * | 12/2010 | Boykin | G06F 3/0482  |
|           |    |   |         |            | 715/771      |
| 2012/0173215 | A1 | * | 7/2012  | Buchan | G06F 19/327  |
|           |    |   |         |            | 703/6        |
| 2013/0106861 | A1 | * | 5/2013  | Harden | G06T 11/206  |
|           |    |   |         |            | 345/440      |

\* cited by examiner

*Primary Examiner* — Hamza Algibhah
(74) *Attorney, Agent, or Firm* — Park, Vaughan, Fleming & Dowler LLP; Laxman Sahasrabuddhe (57) ABSTRACT

The present invention relates to displaying data in a time-aligned fashion. A dashboard may have a defined time window and a plurality of graphs for various types of monitoring data metrics. Updates to each of the graphs may occur at different intervals while the graphs stay aligned to the same time window. The updates may be asynchronously received and displayed in the dashboard in real-time or near real-time. The graphs are aligned to the same time window in a dashboard by adding a future time buffer. When the live data reaches the end of the time window, the future time buffer allows a brief overflow period for updates to be added to the graphs while keeping all the graphs on a common time axis. Once the current time reaches the end of the future time buffer, the dashboard is then shifted forward and a future time buffer is added.

19 Claims, 7 Drawing Sheets

FIG. 4B
TIME = 12:30:15

UPDATES FILLED IN TO FUTURE TIME BUFFER

FIG. 4C
TIME = 12:30:45

TIME WINDOW SHIFTED FORWARD TO TIME AXIS OF
12:16:00-12:31:00 FOR ALL GRAPHS AT SAME TIME

FIG. 4D
TIME = 12:31:00

METHODS AND SYSTEMS FOR EFFICIENT UPDATING OF TIME-ALIGNED GRAPHS IN A MONITORING SYSTEM

CROSS-REFERENCE TO RELATED APPLICATIONS

This application claims the benefit of priority of U.S. Provisional Application No. 61/576,172 filed Dec. 15, 2011, entitled "Efficient Updating of Time-Aligned Graphs in a Monitoring System," which is incorporated by reference in its entirety.

BACKGROUND

Application performance management relates to technologies and systems for monitoring and managing the performance of applications. For example, application performance management is commonly used to monitor and manage transactions performed by an application running on a server to a client.

A key piece of functionality for monitoring applications is to display the monitoring data. One example is the use of dashboards to represent data visually. In a dashboard, the data in each graph is commonly provided in the form of time-value pairs for a given metric: the time at which a measurement was taken, and the corresponding value of the metric. Frequently, a dashboard will consolidate multiple graphs for different monitoring data metrics in the same display. Often, it is necessary to provide "real-time" or "near-real-time" dashboards, where the dashboard's display is updated within a few seconds of when the measurement was taken. However, the updates for different metrics may occur at different intervals.

Unfortunately, if the consolidated dashboard is displaying the live data, then the dashboard's time axis needs to be redrawn with every new data point. If there are several metrics updating frequently, then the time axis and all the related graphs have to also be updated. As a result, the dashboard must update itself rapidly, making it difficult to view and interpret. In addition, rapid updates waste processing resources that would otherwise be used to improve system performance.

Therefore, it would be desirable to provide a display that can be updated in a more efficient fashion to facilitate viewing and interpretation. In addition, it would be desirable to provide a method and system that conserves processing resources.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

Overview

The embodiments relate to displaying data, for example, in a dashboard as part of a user interface. The dashboard has a defined time window, which specifies how much data is displayed, and a future time buffer. The dashboard may comprise a plurality of graphical representations, graphical elements, or simply, graphs, for various types of monitoring data metrics. Updates to each of the graphs may occur at different intervals even though the graphs are aligned to the same time window in the dashboard. The future time buffer minimizes the amount of redrawing required in the presence of updates at different times and/or frequencies. When the live data reaches the end of the time window, the future time buffer allows a brief overflow period for updates to be added to the graphs while keeping all the graphs on a common time axis. The time window of the dashboard is then shifted forward once the current time reaches the end of the future time buffer.

The embodiments may be useful, for example, for displaying a variety of metrics and data in real-time or near real-time in a time-aligned fashion. For example, the embodiments may be implemented in displaying data for application performance monitoring data, network performance data, data from sensors, financial data, etc. Those skilled in the art will recognize that the embodiments can be applicable to any form of multiple, real-time, asynchronous, data from one or more sources in which a time-aligned display is desired.

In the following description, for purposes of explanation rather than limitation, specific details are set forth such as the particular architecture, interfaces, techniques, etc., in order to provide an understanding of the concepts of the invention. However, it will be apparent to those skilled in the art that the present invention may be practiced in other embodiments, which depart from these specific details.

Certain embodiments of the inventions will now be described. These embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. For example, for purposes of simplicity and clarity, detailed descriptions of well-known components, such as circuits, are omitted so as not to obscure the description of the present invention with unnecessary detail. To illustrate some of the embodiments, reference will now be made to the figures showing an exemplary implementation of the invention in the field of application performance management. As noted above, the invention may be applied to any type of data in which time-aligned display is desired.

Exemplary System

Figure 1:
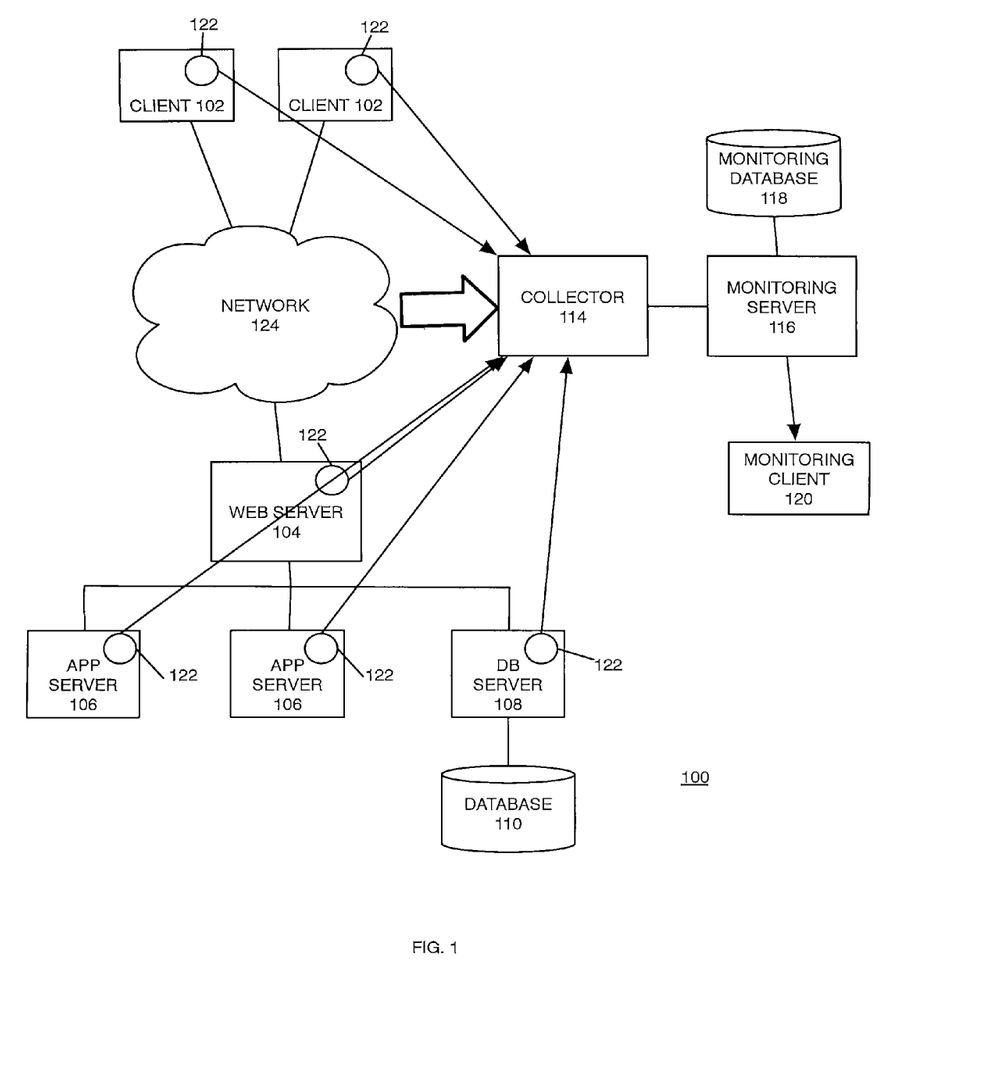
FIG. 1 illustrates an exemplary system in accordance with the principles of the present invention.

FIG. 1 illustrates an exemplary system to support an application and an application performance management (or monitoring) system. In general, the application performance management system 100 may collect a wide variety of metrics and display these metrics to the user for monitoring or analysis. As will be described further below, the application performance management system 100 may provide a dashboard. In some embodiments, the dashboard may comprise multiple graphs for various metrics that are aligned to a common time axis and time window using a future time buffer. For example, the application management system 100 may collect metrics related to processor utilization, memory usage, network traffic, latency, and the like.

For purposes of illustration, the components of an exemplary system 100 are provided with reference to FIG. 1. As shown, the system 100 may comprise a set of clients 102, a web server 104, application servers 106, a database server 108, a database 110, and application performance management system 112. The application performance management system 112 may comprise a collector 114, a monitoring server 116, and a monitoring database 118. The application performance management system 112 may also be accessed via a monitoring client 120. These components will now be further described.

Clients 102 refer to any device requesting and accessing services of applications provided by system 100. Clients 102 may be implemented using known hardware and software. For example, clients 102 may be implemented on a personal computer, a laptop computer, a tablet computer, a smart phone, and the like. Such devices are well known to those skilled in the art and may be employed in one embodiment.

The clients 102 may access various applications based on client software running or installed on the clients 102. The clients 102 may execute a thick client, a thin client, or hybrid client. For example, the clients 102 may access applications via a thin client, such as a browser application like Internet Explore, Firefox, etc. Programming for these thin clients may include, for example, JavaScript/AJX, JSP, ASP, PHP, Flash, Siverlight, and others. Such browsers and programming code are known to those skilled in the art.

Alternatively, the clients 102 may execute a thick client, such as a stand-alone application, installed on the clients 102. Programming for thick clients may be based on the .NET framework, Java, Visual Studio, etc.

Web server 104 provides content for the applications of system 100 over a network, such as network 124. Web server 104 may be implemented using known hardware and software to deliver application content. For example, web server 104 may deliver content via HTML pages and employ various IP protocols, such as HTTP.

Application servers 106 provide a hardware and software environment on which the applications of system 1000 may execute. In one embodiment, applications servers 106 may be implemented based as Java Application Servers, Windows Server implement a .NET framework, LINUX, UNIX, WebSphere, etc. running on known hardware platforms. Application servers 106 may be implemented on the same hardware platform as the web server 104, or as shown in FIG. 1, they may be implemented on their own hardware.

In one embodiment, application servers 106 may provide various applications, such as mail, word processors, spreadsheets, point-of-sale, multimedia, etc. Application servers 106 may perform various transaction related to requests by the clients 102. In addition, application servers 106 may interface with the database server 108 and database 110 on behalf of clients 102, implement business logic for the applications, and other functions known to those skilled in the art.

Database server 108 provides database services to database 110 for transactions and queries requested by clients 102. Database server 108 may be implemented using known hardware and software. For example, database server 108 may be implemented based on Oracle, DB2, Ingres, SQL Server, MySQL, etc. software running on a server.

Database 110 represents the storage infrastructure for data and information requested by clients 102. Database 110 may be implemented using known hardware and software. For example, database 110 may be implemented as relational database based on known database management systems, such as SQL, MySQL, etc. Database 110 may also comprise other types of databases, such as, object oriented databases, XML databases, and so forth.

Application performance management system 112 represents the hardware and software used for monitoring and managing the applications provided by system 100. As shown, application performance management system 112 may comprise a collector 114, a monitoring server 116, a monitoring database 118, a monitoring client 120, and agents 122. These components will now be further described.

Collector 114 collects application performance information from the components of system 100. For example, collector 114 may receive information from clients 102, web server 104, application servers 106, database server 108, and network 124. The application performance information may comprise a variety of information, such as trace files, system logs, etc. Collector 114 may be implemented using known hardware and software. For example, collector 114 may be implemented as software running on a general-purpose server. Alternatively, collector 114 may be implemented as an appliance or virtual machine running on a server.

Monitoring server 116 hosts the application performance management system. Monitoring server 116 may be implemented using known hardware and software. Monitoring server 116 may be implemented as software running on a general-purpose server. Alternatively, monitoring server 116 may be implemented as an appliance or virtual machine running on a server.

Monitoring database 118 provides a storage infrastructure for storing the application performance information processed by the monitoring server 116. Monitoring database 118 may be implemented using known hardware and software.

Monitoring client 120 serves as a user interface for accessing monitoring server 116. For example, monitoring client 120 may be implemented as a personal computer running an application or web browser accessing the monitoring server 120. In some embodiments, the monitoring client 120 is configured to display a dashboard having one or more graphs for various collected metrics. The monitoring client 120 may display the dashboard, for example, using an installed application or web browser based on data received from monitoring server 116. Some examples of a dashboard for a user interface by monitoring client 120 are provided with reference to FIGS. 4A-4D.

Agents 122 serve as instrumentation for the application performance management system. As shown, the agents 122 may be distributed and running on the various components of system 100. Agents 122 may be implemented as software running on the components or may be a hardware device coupled to the component. For example, agents 122 may implement monitoring instrumentation for Java and .NET framework applications. In one embodiment, the agents 122 implement, among other things, tracing of method calls for various transactions.

Network 124 serves as a communications infrastructure for the system 100. Network 124 may comprise various known network elements, such as routers, firewalls, hubs, switches, etc. In one embodiment, network 124 may support various communications protocols, such as TCP/IP. Network 124 may refer to any scale of network, such as a local area network, a metropolitan area network, a wide area network, the Internet, etc.

Exemplary Dashboard

Figure 2:
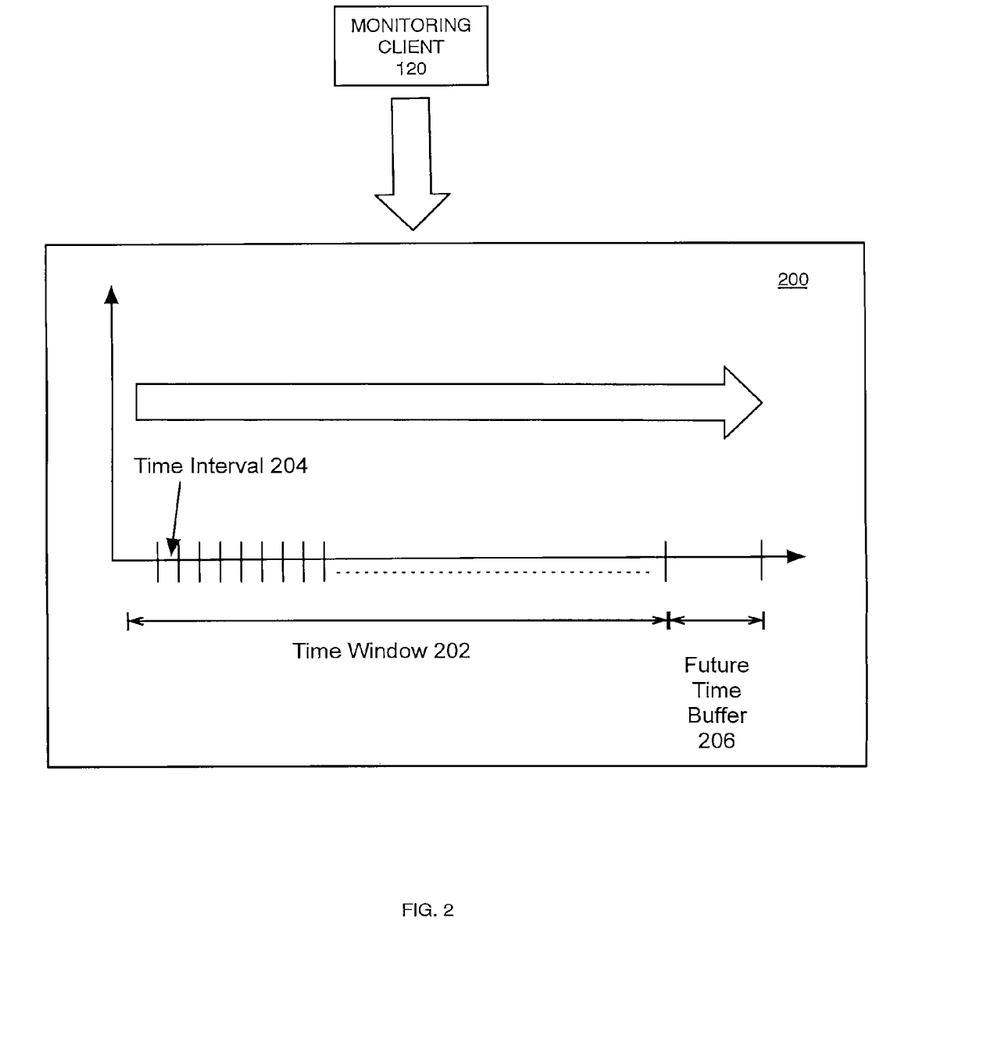
FIG. 2 illustrates a dashboard with a single graph having a time window and a future time buffer in accordance with the principles of the present invention.

FIG. 2 illustrates a dashboard with a single element or graph having a time window and a future time buffer in accordance with the principles of the present invention. In particular, the monitoring server 116 or monitoring client 120 may provide a display shown as dashboard 200. In some embodiments, the dashboard 200 may comprise a graph that is configured as shown in FIG. 2. As shown, a dashboard 200 is displaying a single graph for a time-varying metric. When a dashboard 200 is created, it has a defined duration and time window 202, which specifies how much data is displayed. The time window 202 may be segmented based on a time interval 204. The time interval 204 may be any appropriate size, such as seconds, minutes, hours, days, etc.

For the metrics displayed in the dashboard 200, updates may, for example, come in every second, every minute, etc. Although FIG. 2 shows a single graph, the embodiments allow the dashboard 200 to show multiple time-varying metrics together in the same display panel and using the same time axis. FIGS. 4A-4D illustrate a dashboard with multiple graphs for different metrics.

As noted, various metrics may get updated at different times or frequencies, even though they are displayed in the same time window 202 in dashboard 200. In some embodiments, a future time buffer 206 is added to the time window 202. With future time buffer 206, updates can be added to graphs in the dashboard 200 without shifting the data or time axis on every addition of new data points.

In some embodiments, when the current live time matches the end of the future time buffer 206, then the time window 202 will shift forward the amount of the time window 202 and add a future time buffer 206 to provide a buffer of future time in dashboard 200.

The future time buffer 206 may be sized in various ways. In some embodiments, the future time buffer 206 is determined based on a percentage of the time window 202, such as approximately 10% of the time window 202. Accordingly, the future time buffer 206 allows data in the dashboard 200 to continue to fill in at its normal rate, but allows the dashboard 200 to update its common time axis and shift the time window 202 at fixed or dynamic intervals. This feature allows, among other things, a better visual experience and conservation of processing resources.

The size of the future time buffer 206 may be rounded to the nearest round time interval. For example, in one embodiment, a pre-determined set of round time intervals, such as 1 day; 12 hours; 8 hours; 4 hours; 1 hour; 30 minutes; 15 minutes; 10 minutes; 5 minutes; 1 minute; 30 seconds; 15 seconds; 10 seconds, etc. are used to determine the size of the future time buffer 206. One of ordinary skill in the art should recognize that the set of round time intervals may also be determined dynamically.

Furthermore, the future time buffer 206 may also be checked to ensure that it is at least a minimum size. For example, in one embodiment, the size of the future time buffer 206 may be required to be greater than or equal to a threshold percentage of the size of the time interval 204, such as 75%, 80%, 90%, etc. For example, a time window 202 may be 15 minutes and segmented into intervals 204 of 1 minute. Using 10% as an initial size, monitoring client 120 may result in 15 minutes×10%=1.5 minutes (or 90 seconds) for the future time buffer 206. The monitoring server 116 or monitoring client 120 may also check that this value for future time buffer 206 is greater than 90% of the size of time interval 202, i.e., 1.5 minutes>=90%×1 minute. As noted above, the monitoring server 116 or monitoring client 120 may then round to the nearest round interval. In the present example, the nearest round interval may be 1 minute.

Therefore, in the example provided above, the dashboard 200 may employ a future time buffer 206 of 1 minute.

Exemplary Process Flow using a Future Time Buffer

Figure 3:
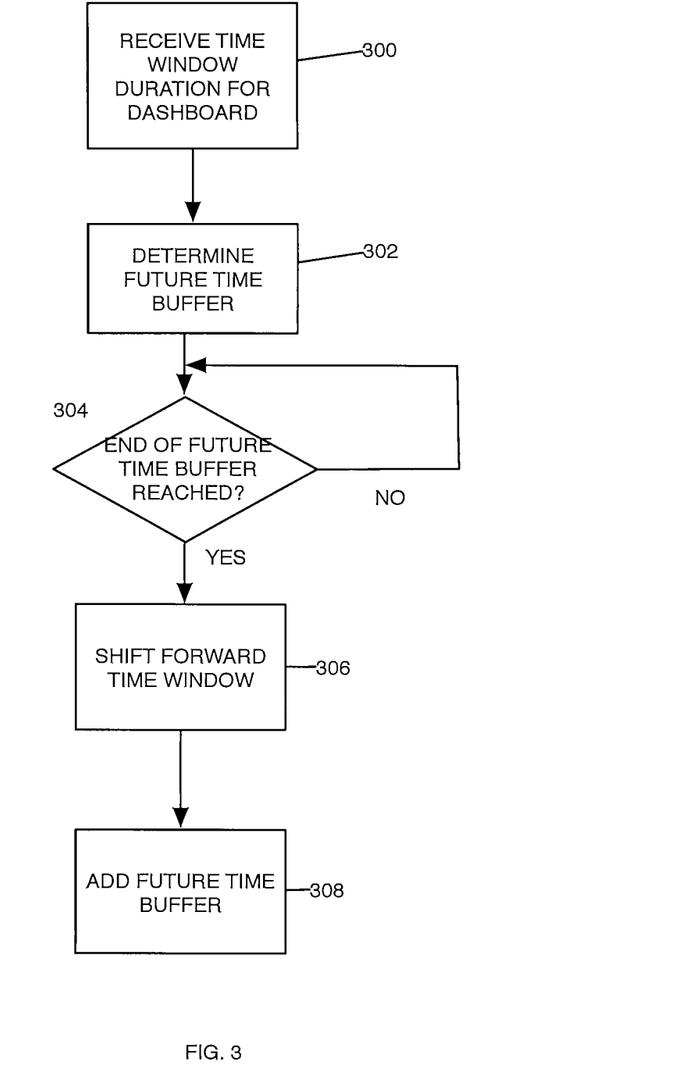
FIG. 3 illustrates an exemplary process flow in accordance with an embodiment of the present invention.

FIG. 3 illustrates an exemplary process flow for displaying a dashboard. In phase 300, the application monitoring system 100 receives a desired duration for the time window 202. The duration may be provided to the system 100 in a variety of ways. For example, a user may access monitoring client 120 and specify a desired duration for the time window 202. Alternatively, the monitoring server 116 may determine the duration of time window 202.

In phase 302, the future time buffer 206 is determined for the time window 202. The monitoring server 116 or monitoring client 120 may determine the future time buffer 206. For example, the monitoring server 116 may stream data and specify the duration for time window 202 and future time buffer 206 for a dashboard 200 displayed on monitoring client 120. Alternatively, the monitoring client 120 may itself control the configuration of the dashboard 200, for example, based on user preferences.

As noted above, in some embodiments, the future time buffer 206 is determined based on a percentage of the time window 202 relative to the size of the time interval 204 by which time window 202 is segmented and the nearest round interval. For example, the future time buffer 206 may be based on percentages, such as 5%, 10%, 15%, etc. of the time window 202. In addition, the time interval 204 may be various sizes, such as 1 second, 10 seconds, 30 seconds, 1 minute, 1 hour, etc. Furthermore, various round intervals may be specified for the use of future time buffer 206 such as 1 day; 12 hours; 8 hours; 4 hours; 1 hour; 30 minutes; 15 minutes; 10 minutes; 5 minutes; 1 minute; 30 seconds; 15 seconds; 10 seconds, etc.

The use of these parameters for determining the future time buffer 206 provides several advantages. First, it provides a large enough future time buffer 206 to allow for different update intervals used by the various metrics displayed in the dashboard 200. Second, the embodiments attempt to provide a future time buffer 206 that is small enough that it doesn't interfere with the responsiveness of the dashboard 200. Other advantages and uses of the future time buffer 206 may be recognized by those skilled in the art.

In phase 304, the dashboard 200 is checked for whether the current time has reached the end of the future time buffer 206. If not, then processing repeats. If yes, then processing proceeds to phase 306. Of note, the future time buffer 206 allows data for different graphs in the dashboard 200 to continue to fill in at their normal rate, but allows the dashboard 200 to update its common time axis and shift the time window 202 at fixed or dynamic intervals. For example, data for one graph may fill in, and in effect, overflow into the future time buffer 206, while another graph is awaiting updates. Thus, the future time buffer 206 provides a buffer for some of the graphs in dashboard 200 to update without disturbing other graphs that are still awaiting updates.

In phase 306, the current time has reached the end of future time buffer 206. Accordingly, the dashboard 200 shifts the time window forward. In some embodiments, the dashboard 200 shifts the time window 202 in one of various ways. For example, the dashboard 200 may shift the time window 202 by the amount of the future time buffer 206. As another example, the dashboard 200 may shift the time window 202 forward by one or more time intervals 204, such as 1 minute, 2 minutes, etc.

In addition, in phase 308, the dashboard 200 adds the future time buffer 206 to the shifted time window 202. In some embodiments, the dashboard 200 may use the same size for future time buffer 206. In other embodiments, the dashboard 200 may recalculate the size of the future time buffer 206 each time when shifting time window 202 forward. Of course, other variations may be implemented in the embodiments.

Examples of Use of the Future Time Buffer

Figure 4A:
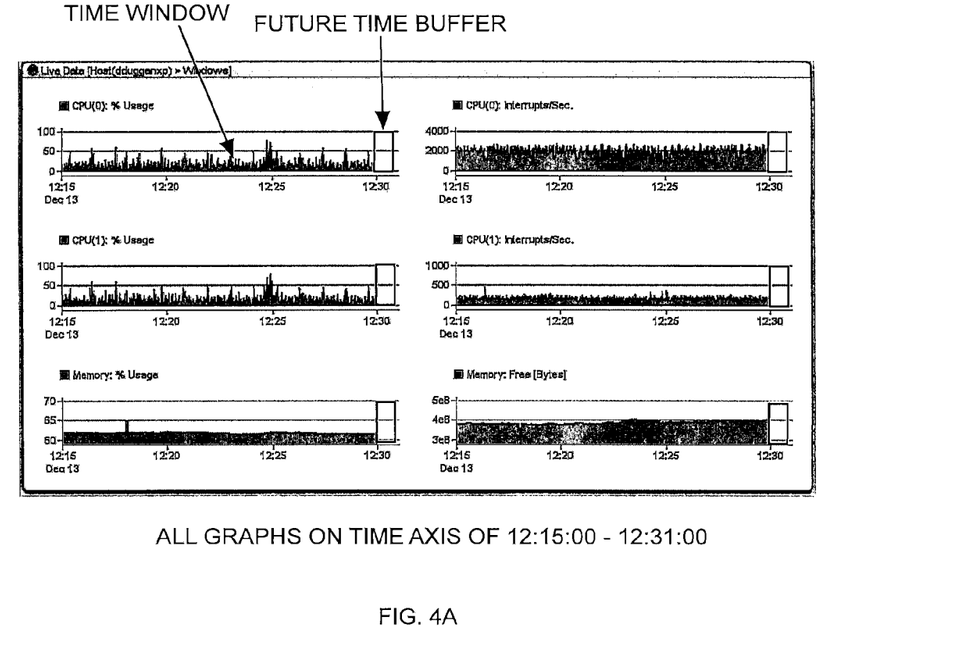
FIGS. 4A-4D illustrate examples of a dashboard with multiple graphs employing a future time buffer in accordance with the principles of the present invention.
Figure 4B:
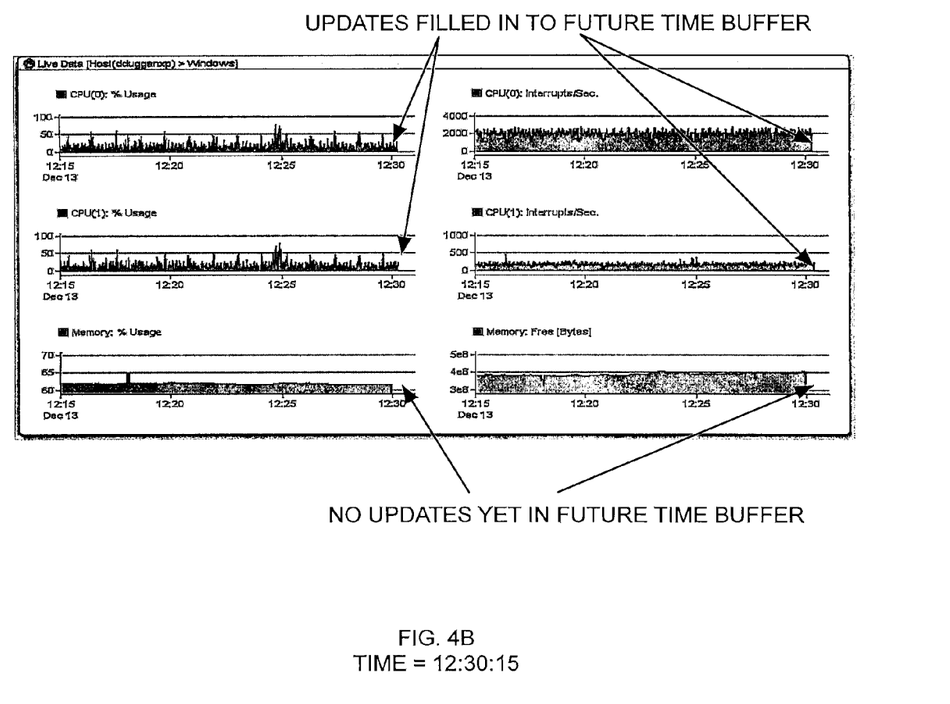
Figure 4C:
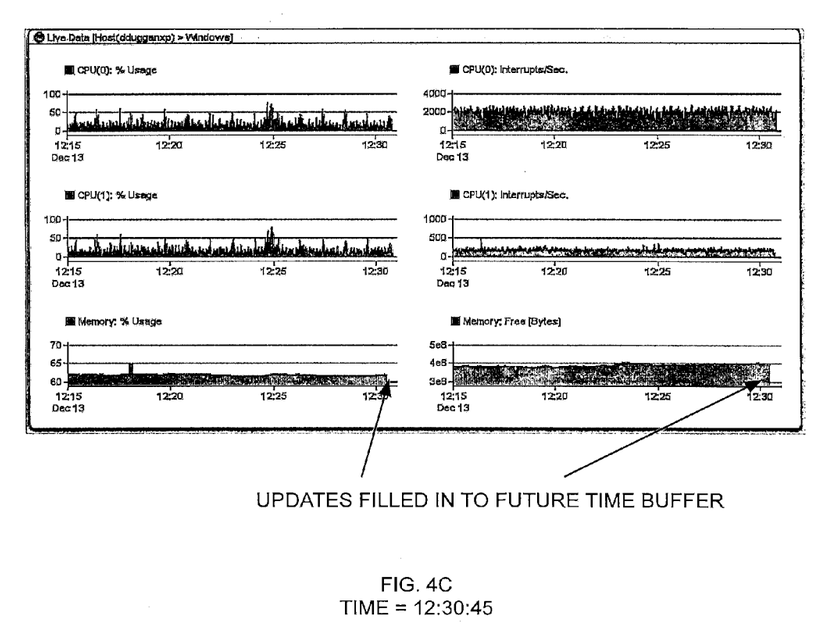
Figure 4D:
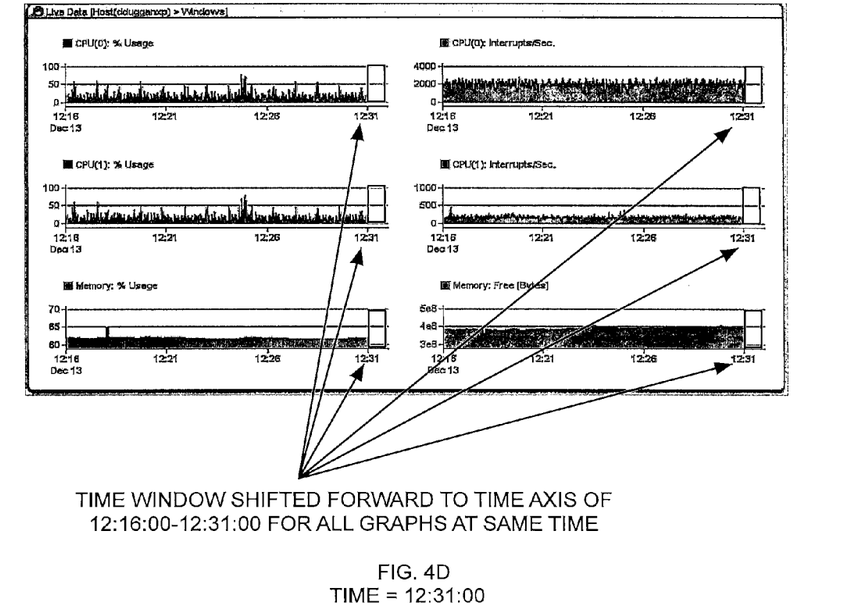

FIGS. 4A-4D illustrate examples of a dashboard with multiple graphs employing a future time buffer in accordance with the principles of the present invention. In the examples shown, when the dashboard is created, the initial axis will preferably have clean start and end times that are divisible by the time buffer, e.g. 12:15:00 and 012:16:00. To assist in understanding the embodiments, FIGS. 4B-4D show examples of updates to one or more of the graphs in a dashboard without having to update the unaffected graphs. That is, the use of a future time buffer effectively dampens or reduces the effective update frequency of the time window that is shared across all of the graphs in a dashboard.

In contrast, in the prior art, the time window of the graphs must be shifted and the graphs redrawn each time data is updated for any one of the graphs. As a result, the graphs may be redrawn an excessive number of times, thereby consuming valuable processing resources and creating a visually unappealing display (i.e. where the time axis is constantly changing). For example, if one graph is updated every 15 seconds, another every 30 seconds, and another every minute, then a conventional display will shift the time window and redraw all three graphs at least four times every minute. The embodiments, however, can be configured to shift the time window and redraw the graphs only once in the presence of this same mix of updates.

The prior art approach is especially problematic for asynchronous updates, which may arrive at virtually any time relative to each other. For example, even where multiple graphs are receiving updates at the same time interval (e.g., every 30 seconds), those updates may not be synchronized. Accordingly, a first graph may receive its 30-second update at one time, a second graph may receive its 30-second update at another time, and so on. These asynchronous updates will thus multiply the number of times that the graphs must be redrawn. Therefore, where multiple graphs are time-aligned, conventional dashboards may consume an excessive amount of resources to maintain the time-alignment by redrawing all of the graphs after each individual graph receives updated data.

Referring now to FIGS. 4A-4D, each dashboard shows four graphs showing CPU metrics, which are getting data updates every 15 seconds, and two graphs showing memory metrics, which are getting data updates every 45 seconds. That is, the graphs for the memory metrics are updating slower than the graphs for the CPU metrics. In the examples shown, the dashboards display a 15-minute time window and use a future time buffer of 1 minute using a 10% portion of the time window and a 90% threshold of the interval. The six graphs are aligned to the same time window and future time buffer, i.e., the time axis spans from 12:15:00 to 12:31:00.

For example, the size of the future time buffer may be calculated as follows: 15 min.*0.10=1.5 minute, which is >=90% of 1 minute and lesser round intervals. In this example, the highest round interval, 1 minute, is thus the time buffer.

In FIG. 4A, the dashboard shows data from 12:15:00 to 12:31:00, i.e., the 15-minute time window plus a 1-minute future time buffer. The dashboard shows exemplary metrics collected for application monitoring, such as CPU usage, CPU interrupts, memory usage, and free memory. Of course, the embodiments may be used for displaying any type of data, especially any sort of real-time, asynchronously updated data.

Referring now to FIG. 4B, the dashboard is now shown after 15 seconds have elapsed, i.e., the time is now 12:30:15. Of note, in FIG. 4B, the dashboard is still on the same time axis of data, i.e., 12:15:00 to 12:31:00. However, as also shown, updates for the four CPU graphs are filled in and are now shown in the future time buffer, i.e., the period from 12:30:00 to 12:31:00. The two memory graphs have not yet been updated. Notably, all of the graphs remain on the same time axis of 12:15:00 to 12:31:00 and do not have to be redrawn yet. In contrast, in a prior art dashboard, as updates are received for each of the CPU metric graphs, all of the graphs must be redrawn. At a minimum, where each of the four CPU graphs receive data updates at the same time, all of the graphs in the prior art dashboard are redrawn at least once through 15 seconds. Where the four CPU graphs receive data updates asynchronously, all of the graphs in the prior art dashboard may be redrawn up to four times after only 15 seconds. As should be understood by one of ordinary skill in the art, such redrawing consumes an excessive amount of computer resources and creates a visual frame of reference (i.e. time axis) that is constantly changing in an unnecessary fashion.

Next, referring to FIG. 4C, the dashboard is now shown after 45 seconds have elapsed, i.e., the time is now 12:15:45. Updates have been received for memory usage and free memory and have filled in to the appropriate graphs. Of note, however, the graphs of the dashboard do not have to be redrawn because these new updates can be displayed in the future time buffer. In contrast, in a conventional dashboard display, these new updates to the memory metrics would require further redrawing of all the dashboard graphs. Accordingly, in this example, the embodiments have avoided the need for at least three (i.e. after 15, 30, and 45 seconds) and as many as fourteen (i.e. where all of the data updates arrive asynchronously) redraws of the dashboard graphs.

Referring now to FIG. 4D, data has been received for each of the graphs through the end of the future time buffer, and thus, the dashboard has shifted the time window forward by 1 minute, i.e., the time axis now starts at 12:16:00. In addition, the dashboard has also added the future time buffer again, and thus, the time axis ends at 12:32:00. Of note, the embodiments reduce the frequency that the graphs and display elements have to be redrawn, especially in the presence of asynchronous updates. Notably, where the graphs in a conventional dashboard would have been redrawn at least four times and as many as eighteen times, this example of the embodiments only requires one redrawing for the same time period.

Accordingly, the embodiments provide a more intuitive display that is also efficient in the use of processing resources needed by the monitoring server 116 or monitoring client 120.

The foregoing merely illustrates the principles of the invention. It will thus be appreciated that those skilled in the art will be able to devise various arrangements which, although not explicitly described or shown herein, embody the principles of the invention and are thus within its spirit and scope. Other system configuration and optimization features will be evident to one of ordinary skill in the art in view of this disclosure, and are included within the scope of the following claims.

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments, which do not provide all of the features and advantages set forth herein, are also within the scope of this disclosure. Accordingly, the scope of the present disclosure is intended to be defined only by reference to the appended claims.

What is claimed is:

1. A method of displaying a user interface showing a graphical presentation of a plurality of metrics, said method comprising:
   receiving data indicating a status of a plurality of metrics, wherein the data is updated for each metric in the plurality of metrics at different rates;
   determining a duration for a time window for displaying the received data, wherein the time window is segmented into a series of time intervals;
   determining a future time buffer based on the duration of the time window and a size of the time intervals; and
   displaying the received data for each metric of the plurality of metrics in respective graphical elements that are aligned to the same time axis spanning the duration of the time window plus the future time buffer, wherein updates to the data for at least one metric in the plurality of metrics received after an end of the time window are displayed in the future time buffer, and wherein updates to the data for at least one metric in the plurality of metrics has not been received.

2. The method of claim 1, wherein receiving data indicating a status of a plurality of metrics comprises receiving data indicating processor utilization of a computing device.

3. The method of claim 1, wherein receiving data indicating a status of a plurality of metrics comprises receiving data indicating processor interrupts of a computing device.

4. The method of claim 1, wherein receiving data indicating a status of a plurality of metrics comprises receiving data indicating memory utilization of a computing device.

5. The method of claim 1, wherein receiving data indicating a status of a plurality of metrics comprises receiving data indicating an amount of free memory of a computing device.

6. The method of claim 1, wherein determining the future time buffer comprises determining the future time buffer based on a percentage of the duration of the time window.

7. The method of claim 6, wherein determining the future time buffer comprises determining whether a size of the future time buffer also exceeds a threshold percentage of the size of the intervals.

8. The method of claim 1, further comprising rounding the future time buffer to a size corresponding to one of a set of pre-determined time interval sizes.

9. The method of claim 1, further comprising:
   shifting the time window forward when current time reaches an end of the future time buffer; and
   adding the future time buffer to the shifted time window.

10. A computing device configured to display a user interface showing a graphical presentation of a plurality of metrics, said device comprising:
    an input configured to receive data indicating a status of a plurality of metrics,
    wherein the data is updated for each metric in the plurality of metrics at different rates; and
    a processor configured by executable program code to:
       determine a duration for a time window for displaying the received data, wherein the time window is segmented into a series of time intervals,
       determine a future time buffer based on the duration of the time window and a size of the time intervals, and
       provide information for displaying the received data for each metric of the plurality of metrics in respective graphical elements that are aligned to the same time axis spanning the duration the time window plus the future time buffer, wherein updates to the data for at least one metric in the plurality of metrics received after an end of the time window are displayed in the future time buffer, and wherein updates to the data for at least one metric in the plurality of metrics has not been received.

11. The device of claim 10, further comprising a display configured to display the received data in respective graphical elements that are aligned to the same time axis spanning the duration the time window plus the future time buffer, wherein updates to at least some of the data received after an end of the time window are displayed in the future time buffer.

12. The device of claim 10, wherein the input is configured to receive data indicating a status of a plurality of metrics comprises receiving data indicating processor utilization of a computing device.

13. The device of claim 10, wherein the input is configured to receive data indicating a status of a plurality of metrics comprises receiving data indicating processor interrupts of a computing device monitored.

14. The method of claim 1, wherein receiving data indicating a status of a plurality of metrics comprises receiving data indicating memory utilization of a computing device.

15. The device of claim 10, wherein the input is configured to receive data indicating a status of a plurality of metrics comprises receiving data indicating an amount of free memory of a computing device.

16. The device of claim 10, wherein the processor is configured determine the future time buffer based on a percentage of the duration of the time window.

17. The device of claim 16, wherein the processor is configured to determine whether a size of the future time buffer also exceeds a threshold percentage of the size of the intervals.

18. The device of claim 10, wherein the processor is configured to round the future time buffer to a size corresponding to one of a set of pre-determined time interval sizes.

19. The device of claim 10, wherein the processor is configured to shift the time window forward when time reaches an end of the future time buffer and add the future time buffer to the shifted time window.

* * * * *